US009143754B2

(12) United States Patent
Tsai et al.

(10) Patent No.: US 9,143,754 B2
(45) Date of Patent: Sep. 22, 2015

(54) SYSTEMS AND METHODS FOR MODIFYING STEREOSCOPIC IMAGES

(75) Inventors: Yi-Chao Tsai, Taipei (TW); Chih-Yu Cheng, Taipei (TW)

(73) Assignee: CYBERLINK CORP., Taipei (TW)

( * ) Notice: Subject to any disclaimer, the term of this patent is extended or adjusted under 35 U.S.C. 154(b) by 904 days.

(21) Appl. No.: 13/364,880

(22) Filed: Feb. 2, 2012

(65) Prior Publication Data

US 2013/0202221 A1    Aug. 8, 2013

(51) Int. Cl.
*H04N 13/00* (2006.01)

(52) U.S. Cl.
CPC ....... *H04N 13/0007* (2013.01); *H04N 13/0011* (2013.01); *H04N 2013/0074* (2013.01); *H04N 2013/0081* (2013.01)

(58) Field of Classification Search
None
See application file for complete search history.

(56) References Cited

U.S. PATENT DOCUMENTS

| 4,967,267 | A | 10/1990 | Gallher et al. |
| 6,181,768 | B1 | 1/2001 | Berliner |
| 6,760,469 | B1 | 7/2004 | Berestov et al. |
| 6,862,364 | B1 | 3/2005 | Berestov et al. |
| 7,126,598 | B2 | 10/2006 | Oh et al. |
| 2002/0122585 | A1 | 9/2002 | Swift et al. |
| 2010/0295927 | A1* | 11/2010 | Turner et al. ............... 348/50 |
| 2013/0033490 | A1* | 2/2013 | Zhang ..................... 345/419 |
| 2014/0300703 | A1* | 10/2014 | Ito et al. ................... 348/47 |

* cited by examiner

*Primary Examiner* — Wesley Tucker
(74) *Attorney, Agent, or Firm* — McClure, Qualey & Rodack, LLP

(57) ABSTRACT

Various embodiments are disclosed for modifying stereoscopic images. One embodiment is a method implemented in an image processing device for modifying stereoscopic images. The method comprises retrieving, by an image processing device, a stereoscopic image having at least a first view image and a second view image and retrieving an orientation selection relating to the stereoscopic image, the orientation selection comprising a selection other than one of: a horizontal flip selection and a 180 degree rotation selection. The method further comprises calculating a depth map according to at least part of the stereoscopic image, rotating the first view image based on the orientation selection to obtain a rotated first view image, and generating a new second view image according to the depth map and the rotated first view image.

11 Claims, 14 Drawing Sheets

STAGE 1: RECEIVE LEFT AND RIGHT VIEW IMAGES AND ESTIMATE A DEPTH MAP

LEFT VIEW IMAGE

RIGHT VIEW IMAGE: DASHED PORTION REPRESENTS THE PORTION OF THE BACKGROUND THAT IS OCCLUDED FROM THE PERSPECTIVE OF THE LEFT EYE

STAGE 2: ROTATE THE LEFT VIEW IMAGE

ROTATED LEFT VIEW IMAGE

STAGE 3:

STAGE 4:

STAGE 5: OUTPUT THE NEW RIGHT VIEW IMAGE

NEW RIGHT VIEW IMAGE

SYSTEMS AND METHODS FOR MODIFYING STEREOSCOPIC IMAGES

BACKGROUND

Stereoscopic systems are designed to duplicate real-world experiences by providing each eye with a unique version of the image. By displaying a separate image for each eye, a stereoscopic effect is achieved. For example, objects in a stereoscopic image may appear to be in front of or behind the screen. To view a stereoscopic image, the display system may include a corresponding pair of stereoscopic glasses that ensures that the left eye only sees the image meant for the left eye, and so on for the right eye. In this regard, stereoscopic images create the illusion of depth to individuals by providing a view image for each eye. A number of different technologies exist that are designed to accomplish this, and each technology has its own benefits, drawbacks, and costs.

As stereoscopic media content gains increasing popularity, more devices are becoming available for capturing and editing stereoscopic images. Individuals commonly edit images by performing such operations as flips (in both the horizontal and vertical directions) and rotations. However, editing a stereoscopic image is not always a matter of simply applying these operations directly to the left and right view images of the original image as ghost images and other depth inconsistency problems may arise.

SUMMARY

Briefly described, one embodiment, among others, is a method implemented in an image processing device for modifying stereoscopic images. The method comprises: retrieving, by an image processing device, a stereoscopic image having at least a first view image and a second view image; and retrieving an orientation selection relating to the stereoscopic image, the orientation selection comprising a selection other than one of: a horizontal flip selection and a 180 degree rotation selection. The method further comprises: calculating a depth map according to at least part of the stereoscopic image; rotating the first view image based on the orientation selection to obtain a rotated first view image; and generating a new second view image according to the depth map and the rotated first view image.

Another embodiment is a method that comprises: retrieving, by an image processing device, a stereoscopic image comprising at least three view images; determining an initial order of the at least three view images; and retrieving an orientation selection relating to the stereoscopic image, wherein the orientation selection comprises one of: a horizontal flip selection and a 180 degree rotation selection.

The method further comprises: generating modified stereoscopic image according to the orientation selection, wherein responsive to the orientation selection being a horizontal flip of the stereoscopic image, the method comprises performing the steps of flipping, in a horizontal direction, each of the at least three view images and arranging the at least three view images according to an inverse order relative to the initial order of the at least three view images. Responsive to the orientation selection being a 180 degree rotation of the stereoscopic image, the method comprises performing the steps of rotating, by 180 degrees, each of the at least three view images and arranging the at least three view images according to an inverse order relative to the initial order of the at least three view images.

Another embodiment is a system for modifying stereoscopic images. The system comprises an image processing device and an application executable in the image processing device. The application comprises: logic that retrieves a stereoscopic image having at least a first view image and a second view image; logic that retrieves an orientation selection relating to the stereoscopic image, the orientation selection not being one of: a horizontal flip selection and a 180 degree rotation selection. The application further comprises: logic that calculates a depth map according to at least one of the view images; logic that rotates the first view image based on the orientation selection to obtain a rotated first view image; and logic that generates a new second view image according to the depth map and the rotated first view image.

Other systems, methods, features, and advantages of the present disclosure will be or become apparent to one with skill in the art upon examination of the following drawings and detailed description. It is intended that all such additional systems, methods, features, and advantages be included within this description, be within the scope of the present disclosure, and be protected by the accompanying claims.

BRIEF DESCRIPTION OF THE DRAWINGS

Many aspects of the disclosure can be better understood with reference to the following drawings. The components in the drawings are not necessarily to scale, emphasis instead being placed upon clearly illustrating the principles of the present disclosure. Moreover, in the drawings, like reference numerals designate corresponding parts throughout the several views.

DETAILED DESCRIPTION

Figure 1:
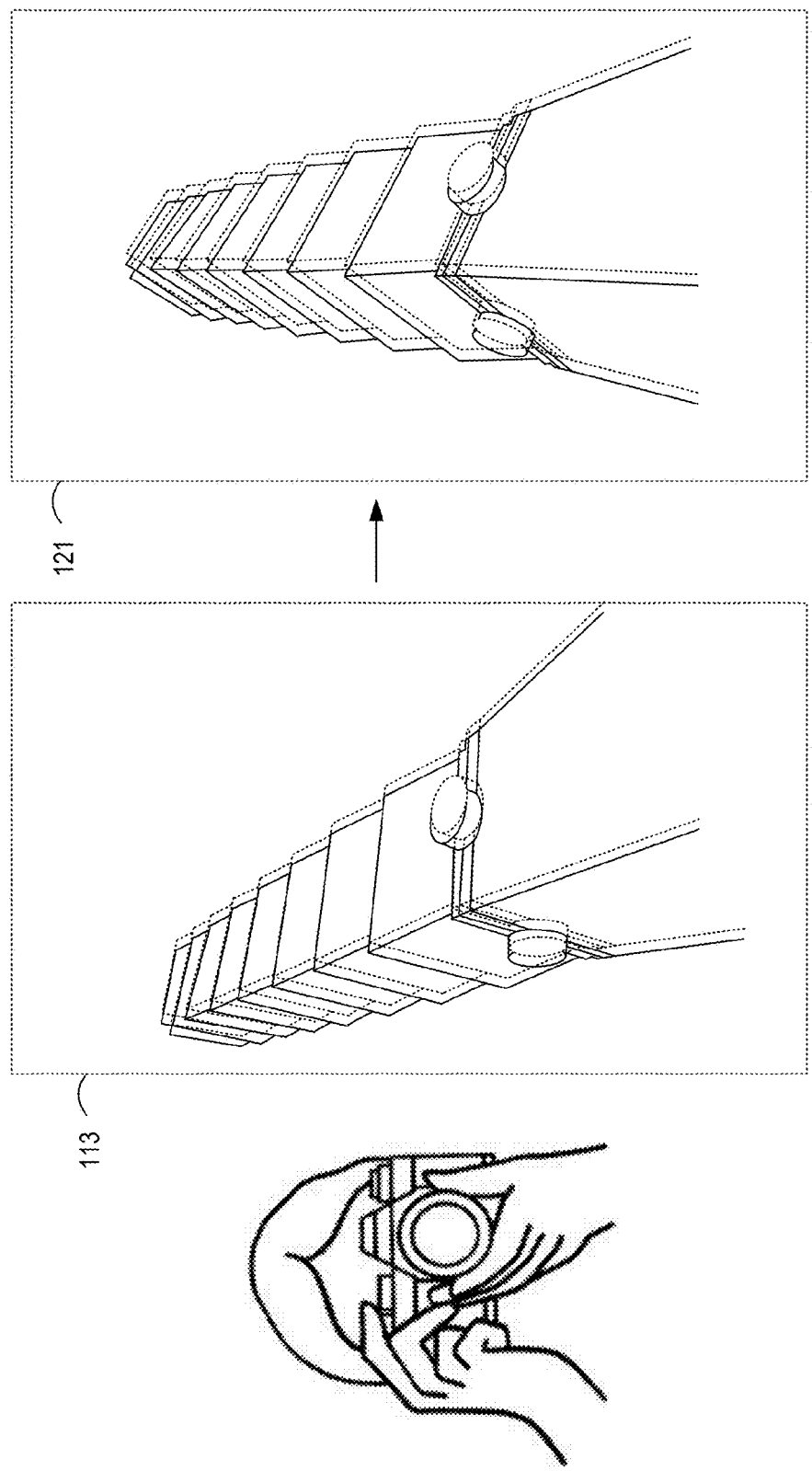
FIG. 1 illustrates an example scenario where a digital image is rotated.

Having summarized various aspects of the present disclosure, reference will now be made in detail to the description of the disclosure as illustrated in the drawings. While the disclosure will be described in connection with these drawings, there is no intent to limit it to the embodiment or embodiments disclosed herein. On the contrary, the intent is to cover all alternatives, modifications and equivalents included within the spirit and scope of the disclosure as defined by the appended claims.

As discussed above, individuals commonly edit images by performing such operations as flips (in both the horizontal and vertical directions) and rotations. However, editing a stereoscopic image is not always a matter of simply applying these operations directly to the left and right view images of the original image as ghost images and other depth inconsistency problems may arise.

Reference is made to FIG. 1, which illustrates a scenario in which an individual may wish to modify an existing image. Shown is an example of an individual capturing digital images with a camera, where the camera may be capable of capturing images in both two-dimensional (2D) and stereoscopic format. In the example shown, the user initially captures an image 113 of an object at an angle and wishes to rotate the object in the captured image 113 so that the object is upright. However, as stereoscopic images comprise both a left-eye view image and a right-eye view image, rotating a stereoscopic image in this case does not comprise simply rotating both view images independently and merging the view images as this may result in undesirable side effects such as ghost imaging. Various embodiments are described for implementing such operations as flips, rotations, etc. for stereoscopic images to generate a modified stereoscopic image 121.

Figure 2:
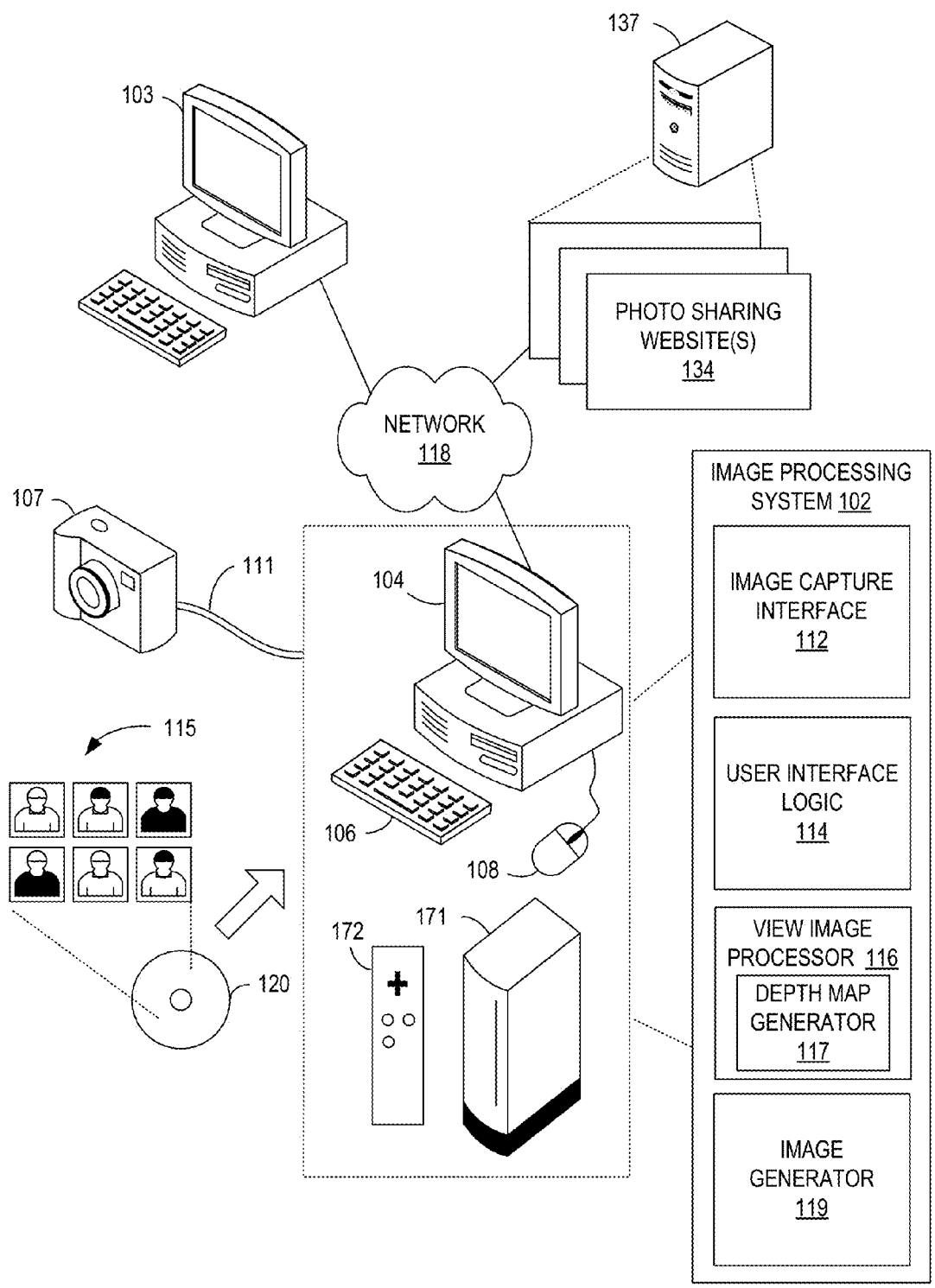
FIG. 2 is a block diagram of an image processing system in which embodiments of image processing techniques as described below may be implemented.

A description of a system for generating modified images is now described followed by a discussion of the operation of the components within the system. FIG. 2 is a block diagram of an image processing system 102 in which embodiments of the image processing techniques disclosed herein may be implemented. The image processing system 102 may be embodied, for example, as a desktop computer, computer workstation, laptop, or other computing platform and includes a display 104 and input devices such as a keyboard 106 and a mouse 108.

In other embodiments, the image processing system 102 may be embodied as a video gaming console 171, which includes a video game controller 172 for receiving user preferences. For such embodiments, the video gaming console 171 may be connected to a television (not shown) or other display.

The image processing system 102 is configured to retrieve, via the image capture interface 112, digital images 115 stored on a storage medium 120 such as by way of example and without limitation, a compact disc (CD) or a universal serial bus (USB) flash drive. As one of ordinary skill will appreciate, the digital images 115 may be encoded in any number of formats, including but not limited to, JPEG (Joint Photographic Experts Group) files, TIFF (Tagged Image File Format) files, PNG (Portable Network Graphics) files, GIF (Graphics Interchange Format) files, and BMP (bitmap) files.

As depicted in FIG. 2, the image capture interface 112 in the image processing system 102 may be configured to retrieve digital images 115 directly from a digital camera 107 where a cable 111 or some other interface may be used for coupling the digital camera 107 to the image processing system 102. The image processing system 102 may support any one of a number of common computer interfaces, such as, but not limited to IEEE-1394 High Performance Serial Bus (Firewire), USB, a serial connection, and a parallel connection.

The digital camera 107 may also be coupled to the image processing system 102 over a wireless connection or other communication path. The image processing system 102 may be coupled to a network 118 such as, for example, the Internet, intranets, extranets, wide area networks (WANs), local area networks (LANs), wired networks, wireless networks, or other suitable networks, etc., or any combination of two or more such networks. Through the network 118, the image processing system 102 may receive digital images 115 from another computing system 103. Alternatively, the image processing system 102 may access one or more photo sharing websites 134 (e.g., Picasa from Google, Flickr®) hosted on a server 137 via the network 118 to retrieve digital images 115.

The user interface logic 114 is configured to provide a graphical user interface for a user of the image processing system 102 to input one or more selections, comprising, for example, an angle for reorienting one or more of the digital images 115 retrieved by the image capture interface 112. The view image processor 116 generates modified view images according to the input retrieved by the user interface logic 114.

The view image processor 116 includes a depth map generator 117 configured to generate depth maps, where depth maps are generated depending on the input retrieved by the user interface logic 114. The image generator 119 merges view images generated by the view image processor 116 and outputs a modified stereoscopic image to be rendered, for example, on the display 104 of the image processing system 102.

Figure 3:
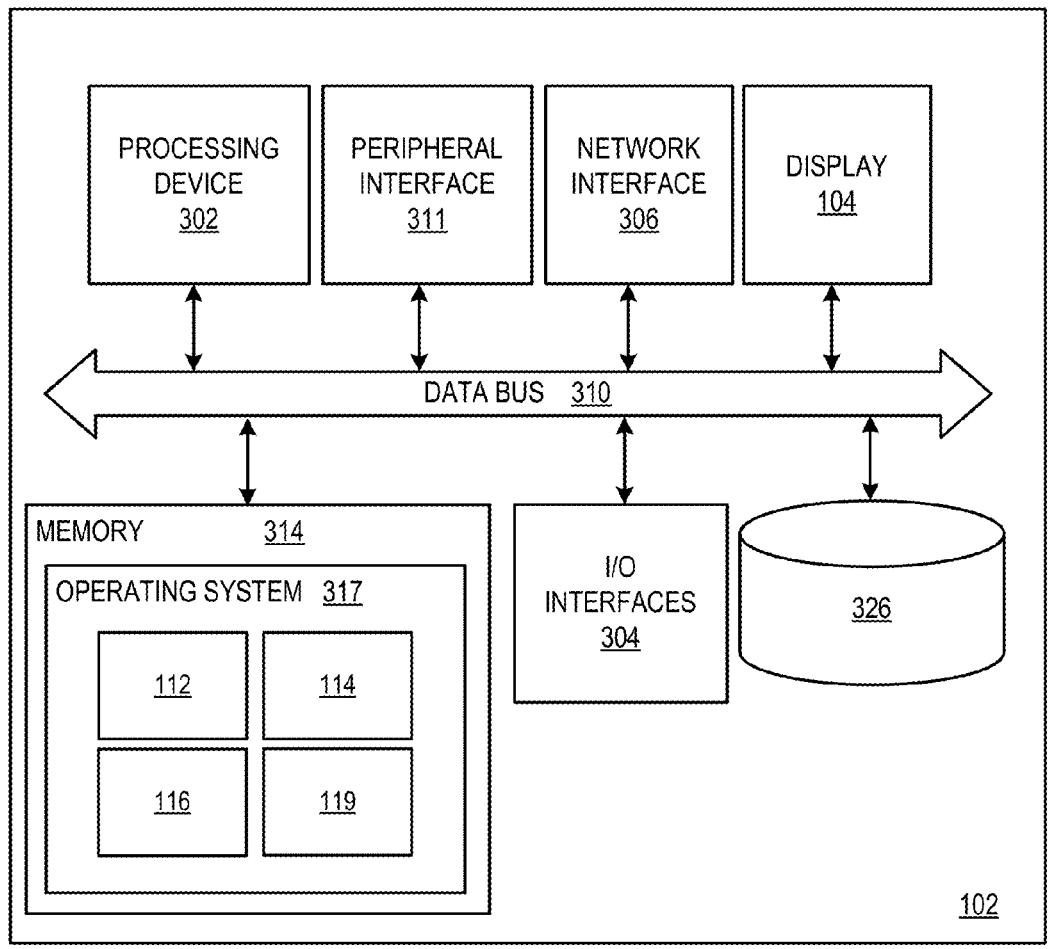
FIG. 3 is a schematic diagram of the image processing system shown in FIG. 2.

FIG. 3 is a schematic diagram of the image processing system 102 shown in FIG. 2. The image processing system 102 may be embodied in any one of a wide variety of wired and/or wireless computing devices, such as a desktop computer, portable computer, dedicated server computer, multiprocessor computing device, smartphone, tablet computing device, and so forth. As shown in FIG. 3, the image processing system 102 comprises a memory 314, a processing device 302, a number of input/output interfaces 304, a network interface 306, a display 104, a peripheral interface 311, and mass storage 326, wherein each of these devices are connected across a local data bus 310.

The processing device 302 may include any custom made or commercially available processor, a central processing unit (CPU) or an auxiliary processor among several processors associated with the image processing system 102, a semiconductor based microprocessor (in the form of a microchip), a macroprocessor, one or more application specific integrated circuits (ASICs), a plurality of suitably configured digital logic gates, and other well known electrical configurations comprising discrete elements both individually and in various combinations to coordinate the overall operation of the computing system.

The memory 314 can include any one of a combination of volatile memory elements (e.g., random-access memory (RAM, such as DRAM, and SRAM, etc.)) and nonvolatile memory elements (e.g., ROM, hard drive, tape, CDROM, etc.). The memory 314 typically comprises a native operating system 317, one or more native applications, emulation systems, or emulated applications for any of a variety of operating systems and/or emulated hardware platforms, emulated operating systems, etc.

The applications may include application specific software which may comprise some or all the components 112, 114, 116, 119 of the image processing system 102 depicted in FIG. 2. In accordance with such embodiments, the components are stored in the memory 314 and executed by the processing device 302. One of ordinary skill in the art will appreciate that the memory 314 can, and typically will, comprise other components which have been omitted for purposes of brevity.

Input/output interfaces 304 provide any number of interfaces for the input and output of data. For example, where the image processing system 102 comprises a personal computer, these components may interface with one or more user input devices via the I/O interfaces 304, where the user input devices may comprise a keyboard 106 (FIG. 2) or a mouse 108 (FIG. 2). The display 104 may comprise a computer monitor, a plasma screen for a PC, a liquid crystal display (LCD) on a hand held device, or other display device.

In the context of this disclosure, a non-transitory computer-readable medium stores programs for use by or in connection with an instruction execution system, apparatus, or device. More specific examples of a computer-readable medium may include by way of example and without limitation: a portable computer diskette, a random access memory (RAM), a read-only memory (ROM), an erasable programmable read-only memory (EPROM, EEPROM, or Flash memory), and a portable compact disc read-only memory (CDROM) (optical).

With further reference to FIG. 3, the network interface 306 comprises various components used to transmit and/or receive data over a network environment. For example, the network interface 306 may include a device that can communicate with both inputs and outputs, for instance, a modulator/demodulator (e.g., a modem), wireless (e.g., radio frequency (RF)) transceiver, a telephonic interface, a bridge, a router, network card, etc. The image processing system 102 may communicate with one or more computing devices 103 (FIG. 1) via the network interface 306 over the network 118 (FIG. 1).

The image processing system 102 may further comprise mass storage 326. The peripheral interface 311 supports various interfaces including, but not limited to IEEE-1394 High Performance Serial Bus (Firewire), USB, a serial connection, and a parallel connection.

Figure 4:
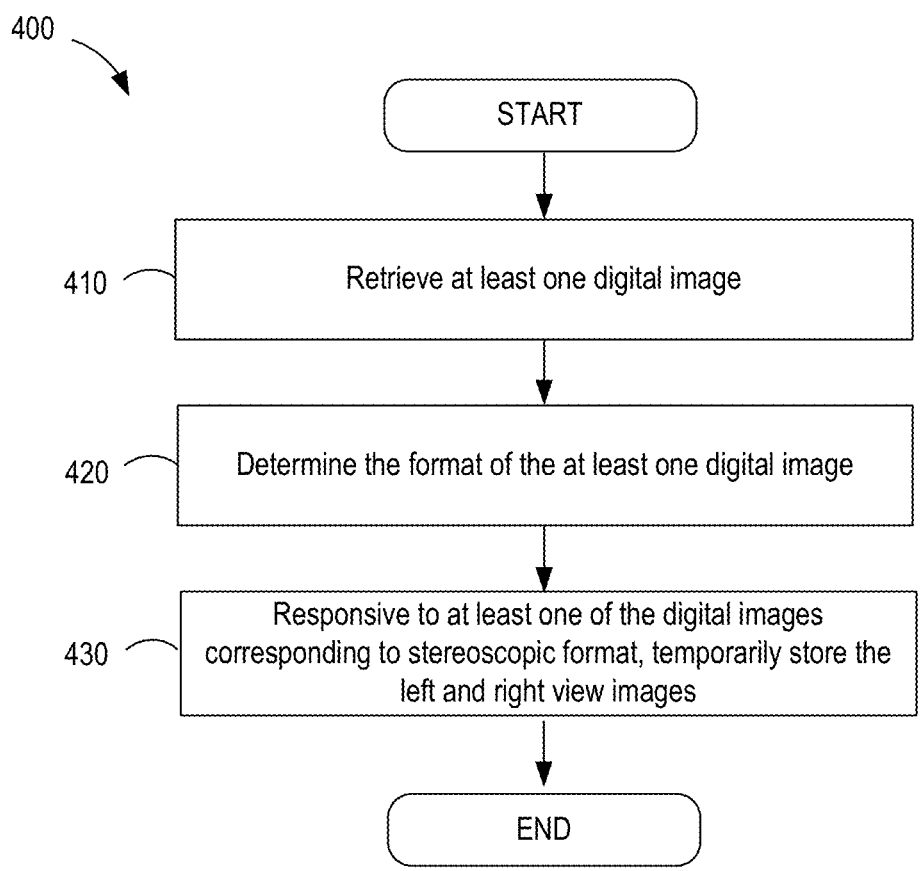
FIG. 4 is a flowchart in accordance with one embodiment for processing images.

Reference is made to FIG. 4, which is a flowchart 400 in accordance with one embodiment for processing images. It is understood that the flowchart 400 of FIG. 4 provides merely an example of the many different types of functional arrangements that may be employed to implement the operation of the image capture interface 112 (FIG. 2) in the image processing system 102 (FIG. 2). As an alternative, the flowchart of FIG. 4 may be viewed as depicting an example of steps of a method implemented in the image processing system 102 according to one or more embodiments.

Beginning with block 410, the image capture interface 112 in the image processing system 102 retrieves at least one digital image 115 (FIG. 2), where the at least one digital image 115 may be retrieved, for example, from a storage medium 120 (FIG. 2), a digital camera 107 (FIG. 2), or other sources.

In block 420, the image capture interface 112 determines the corresponding format for each of the retrieved digital images 115. For example, the image capture interface 112 may be configured to determine whether any of the digital images 115 were captured or stored in stereoscopic format.

In block 430, the image capture interface 112 temporarily stores the left and right view images of those digital images 115 that are in stereoscopic format. As described below, the other components in the image processing system 102 process and modify one or more view images to generate a modified digital image. Thereafter, the flowchart 400 ends as shown.

Figure 5:
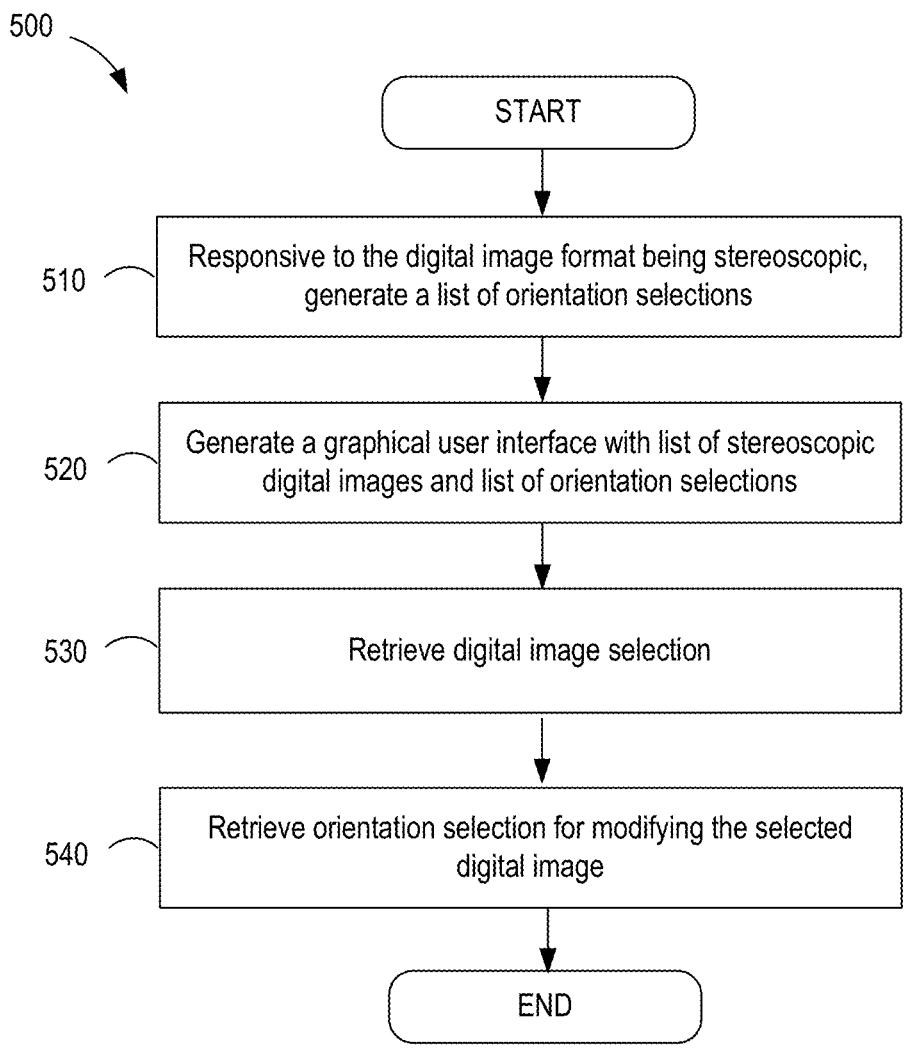
FIG. 5 illustrates operation of the user interface logic in the image processing system of FIG. 2.

Reference is made to FIG. 5, which is a flowchart 500 in accordance with one embodiment for processing images. It is understood that the flowchart 500 of FIG. 5 provides merely an example of the many different types of functional arrangements that may be employed to implement the operation of the user interface logic 114 (FIG. 2) in the image processing system 102 (FIG. 2). As an alternative, the flowchart of FIG. 5 may be viewed as depicting an example of steps of a method implemented in the image processing system 102 according to one or more embodiments.

In block 510, a list of orientation selections is generated by the user interface logic 114 in response to the image capture interface 112 (FIG. 2) determining that at least one of the digital images 115 (FIG. 2) is in stereoscopic format. In block 520, a graphical user interface (GUI) that shows the at least one digital image 115 is presented. The GUI also includes a list of operations that may be performed on the digital images 115 to provide modified digital images. The list of operations may comprise, for example, a flip operation or a rotate operation, among other operations. The graphical user interface also allows the user to specify an angle associated with the operation.

In block 530, the user interface logic 114 retrieves a selection of one or more digital images to be modified. In block 540, the user interface logic 114 retrieves the orientation selection to be performed on the selected digital image. For example, the user may select a particular stereoscopic digital image and specify that the stereoscopic digital image is to be rotated by 90 degrees in the clockwise direction. As another example, the user may specify that the selected stereoscopic digital image is to undergo a flip operation in the vertical direction. Thereafter, the flowchart 500 ends as shown.

Figure 6:
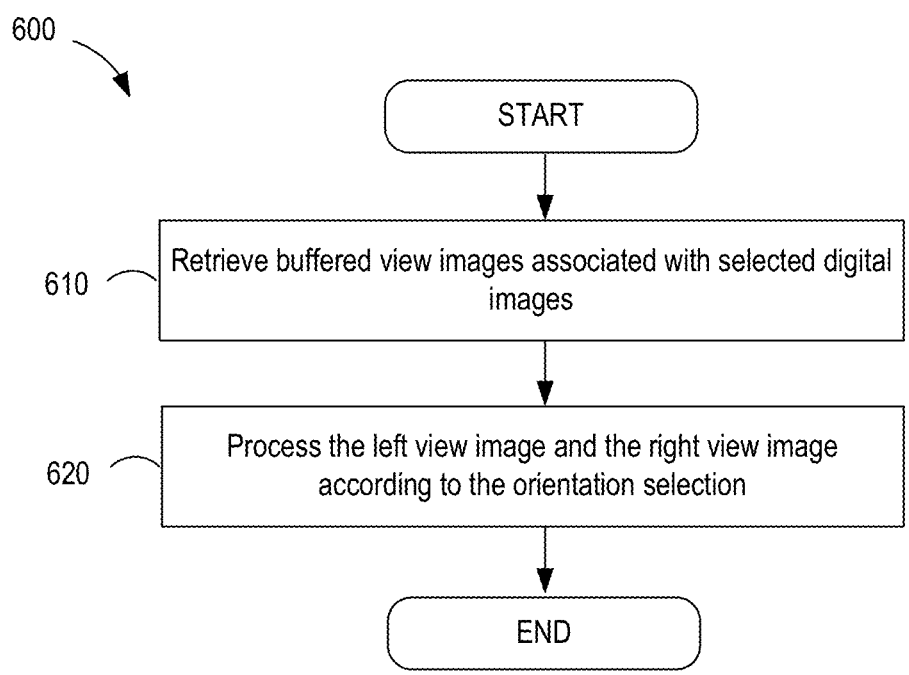
FIG. 6 illustrates operation of the view image processor in the image processing system of FIG. 2.

Reference is made to FIG. 6, which is a flowchart 600 in accordance with one embodiment for processing images. It is understood that the flowchart 600 of FIG. 6 provides merely an example of the many different types of functional arrangements that may be employed to implement the operation of the view image processor 116 (FIG. 2) in the image processing system 102 (FIG. 2). As an alternative, the flowchart of FIG. 6 may be viewed as depicting an example of steps of a method implemented in the image processing system 102 according to one or more embodiments.

In block 610, the view images of the selected digital images 115 (FIG. 2) buffered by the image capture interface 112 (FIG. 2) are retrieved for processing. In block 620, the left view image and the right view image are processed based on the orientation selection made by the user, as described in connection with FIG. 5. In accordance with some embodiments, the orientation selection may be categorized under five main scenarios comprising: 1) a vertical flip operation; 2) a horizontal flip operation; 3) a 180 degree rotation operation; 4) a 90 degree/270 degree rotation operation; and 5) a rotation operation at an angle other than 90 degrees, 180 degrees, or 270 degrees. Below, the view image operations performed by the view image processor 116 are described for each of the categories above.

Figure 7:
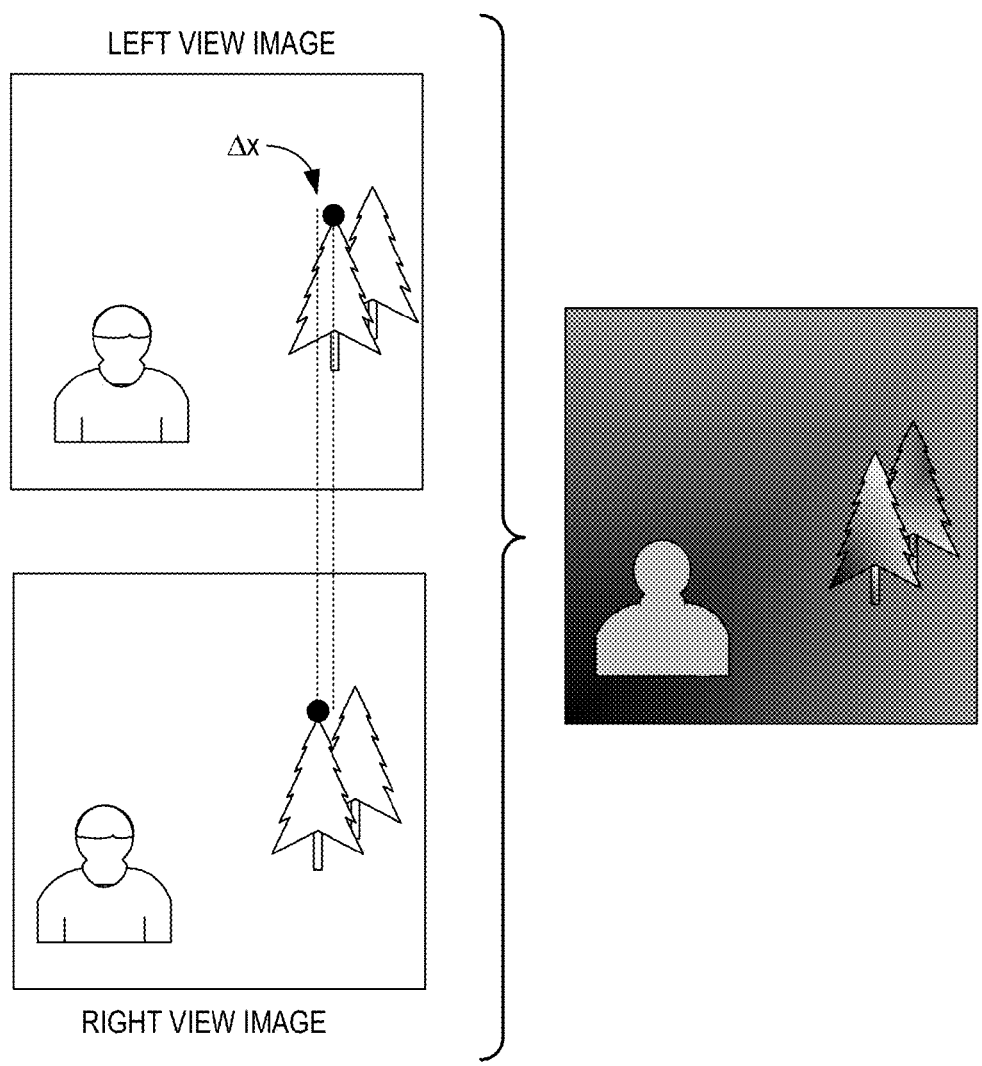
FIG. 7 depicts the left view image and the right view image of an image prior to being edited.

FIG. 7 illustrates how the depth map generator 117 generates a depth map. In accordance with some embodiments, the depth map generator 117 is configured to derive a depth map based on the left view image by identifying feature points within the left view image, where feature points may comprise, for example, a corner feature, an edge feature, a texture feature, a color feature, a facial feature, or some other object within the image. Typically, feature points are selected from objects across varying depths within the image so that samples across different depths are obtained. Within the left view image, the depth map generator 117 determines a difference with respect to horizontal positions of each feature point with respect to the left view image and the right view image.

As shown in the example of FIG. 7, the difference in horizontal positions of a single feature point is determined. In this illustration, the source includes a left view image and a right view image, where the depth map is generated according to feature point differences in horizontal positions between both view images. Note, however, that in accordance with various embodiments, if the source contains not only the left and right view images, but also depth map information, such information can be used to facilitate the post-processing process (e.g., rotation or reorientation of the source). In such cases, the feature point differences do not need to be calculated. For illustration purposes, only a single feature point is shown—the tip of the left tree in this case. The depth map generator 117 determines the difference in horizontal positions, as highlighted by the dashed lines extending between the left view image and right view image.

Figure 8A:
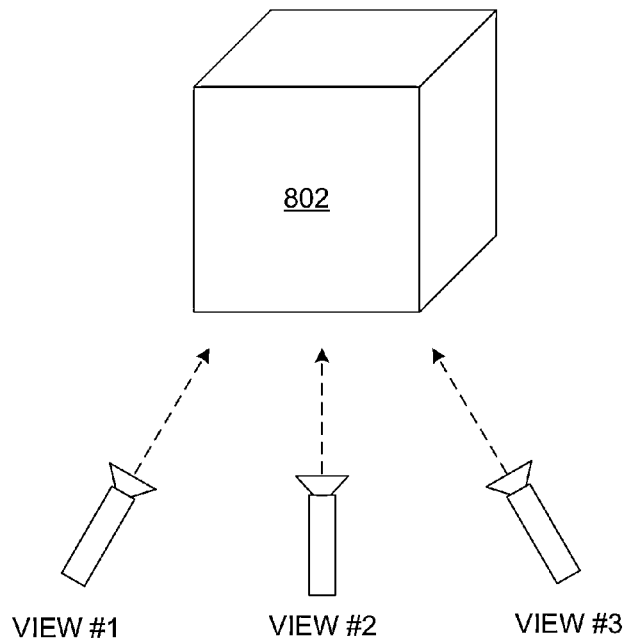
FIGS. 8A, 8B, and 8C illustrate a horizontal flip operation of the image depicted in FIG. 7 for a multi-view implementation.
Figure 8B:
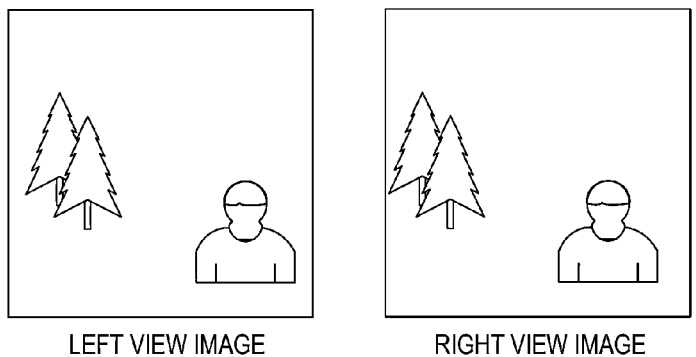

For vertical flip operations, the view image processor 116 flips both the left view image and the right view image in the vertical direction. Shown in FIG. 8A is a multi-view configuration whereby one or more cameras capture various views of a stereoscopic object 802. In the example shown, the stereoscopic image comprises three view images in the order "VIEW #1," "VIEW #2," and "VIEW #3." Reference is made to FIG. 8B, which illustrates the result of a horizontal flip operation for a multi-view configuration. For stereoscopic images comprising only a left view image and a right view image, the view images are flipped and then swapped. As shown, the left view image and the right view image are individually flipped by the view image processor 116. The two view images are then swapped.

Figure 8C:
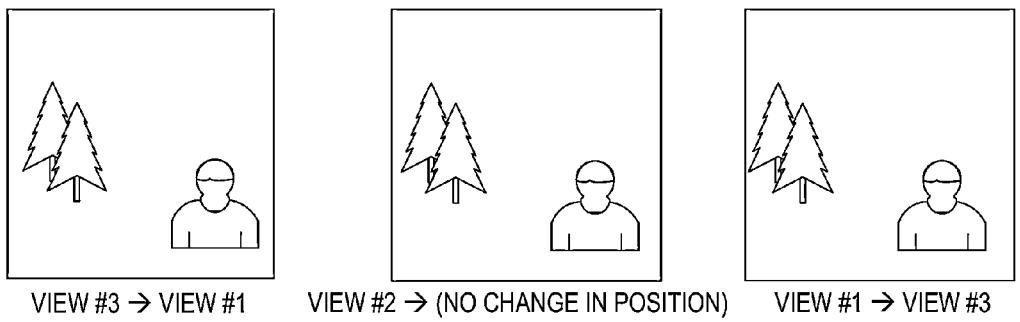

FIG. 8C illustrates the result of a horizontal flip operation for the multi-view configuration shown in FIG. 8A where the stereoscopic image comprises more than two view images. First, each of the view images is individually flipped in the horizontal direction. Next, the order of the views is reversed relative to the original order. In this example, VIEW #1 is replaced with VIEW #3 and vice versa. The order for VIEW #2 does not change. As another example, consider a stereoscopic image with five view images (VIEW #1 to VIEW #5). Upon individually flipping the view images, the order is reversed such that the modified stereoscopic image comprises the following order: VIEW #5, VIEW #4, VIEW #3, VIEW #2, and VIEW #1.

Figure 9:
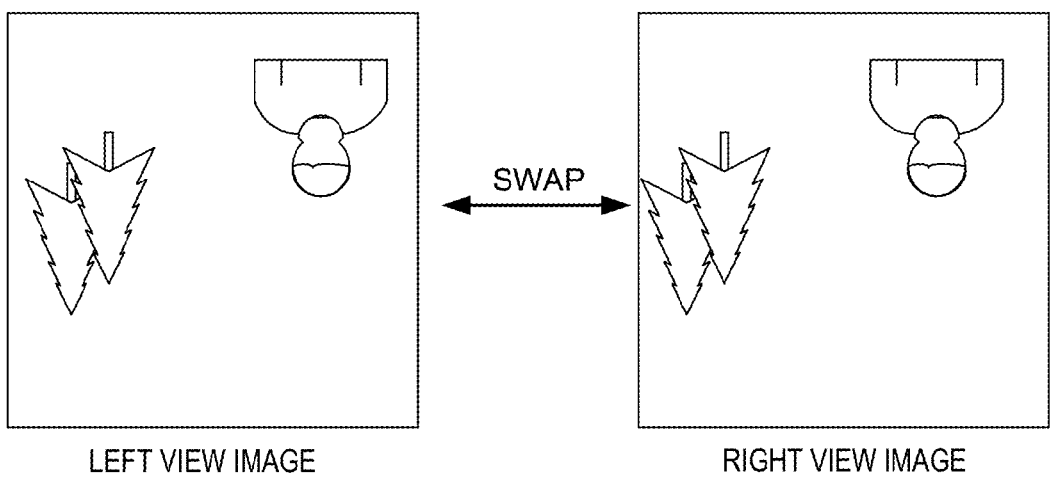
FIG. 9 illustrates a 180 degree rotation operation.
Figure 10:
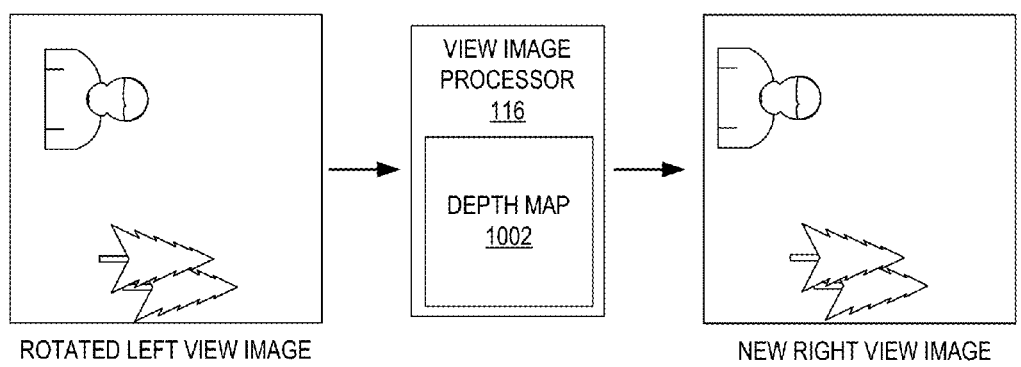
FIG. 10 illustrates a rotation of 90 degrees/270 degrees.

FIG. 9 illustrates a 180 degree rotation operation. As shown, the view image processor 116 rotates both the left view image and the right view image 180 degrees. The view images are then swapped, as illustrated. FIG. 10 illustrates a rotation of 90 degrees/270 degrees. The view image processor 116 rotates the left view image by 90 degrees or 270 degrees (depending on which angle is selected). The depth map generator 117 (FIG. 2) in the view image processor 116 derives a depth map 1002 based on the left view image. The view image processor 116 generates a new right view image based on the depth map 1002 and replaces the original, right view image with the new right view image.

Figure 11A:
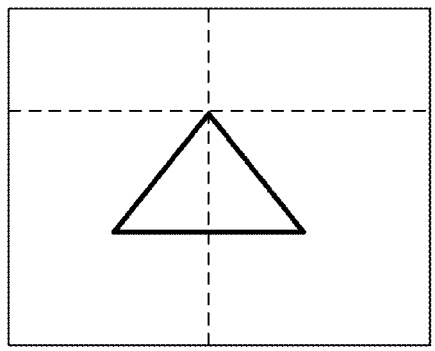
FIGS. 11A and 11B illustrate a rotation operation at an angle other than 90 degrees, 180 degrees, or 270 degrees.
Figure 11A:
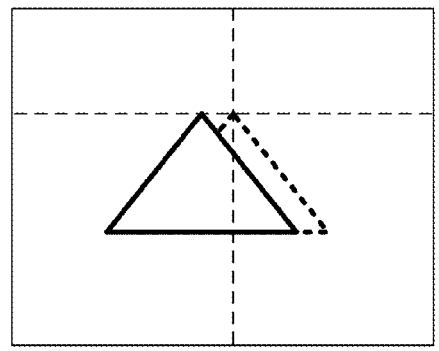
Figure 11A:
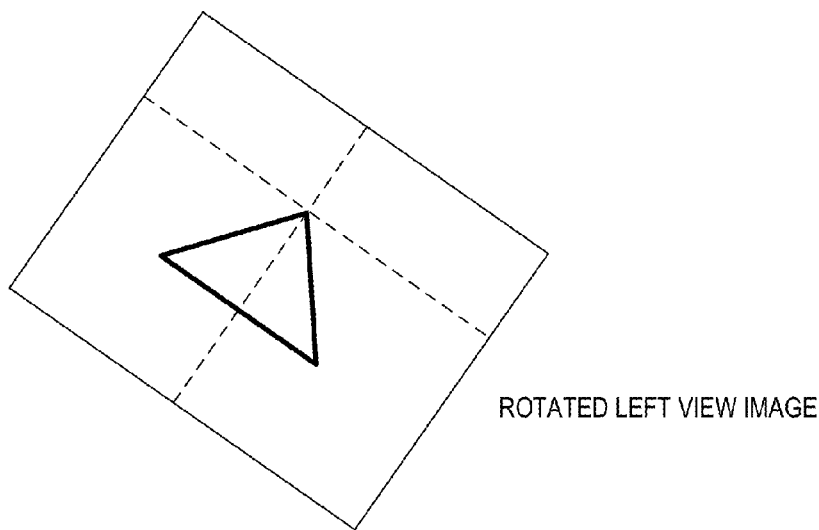
Figure 11B:
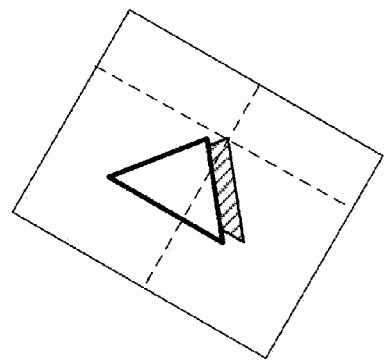
Figure 11B:
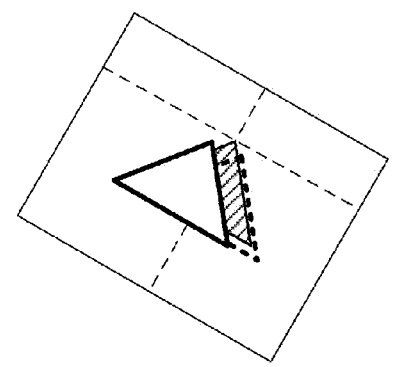
Figure 11B:
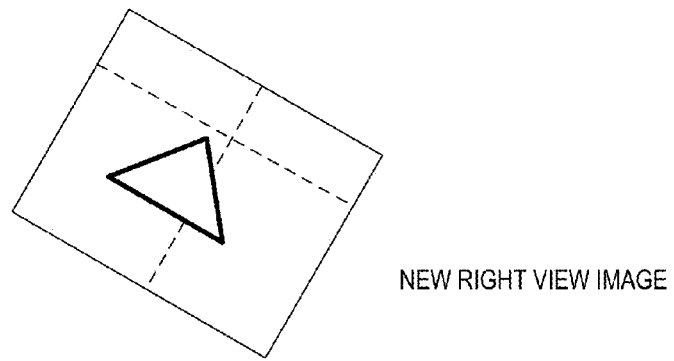

As described earlier, rotation operations do not comprise simply individually rotating the right and left view images. To further illustrate, reference is made to FIG. 13, which is a top view of a foreground object placed in front of a background. As illustrated for the right eye view, a portion of the background is occluded due to the location of the foreground object and the viewing angle. However, that area is still viewable from the perspective of the left eye. Similarly, an area in the background is occluded for the left eye but remains viewable by the right eye. This is further illustrated in stage 1 of FIG. 11A. As shown for the right view image, the dashed outline of the triangle object represents the portion of the background that is viewable by the right eye but is occluded from the perspective of the left eye. The dashed triangle shown corresponds to the occluded region. The embodiment described below for reorienting a stereoscopic image accounts for this effect. In FIGS. 11A and 11B, the dotted lines serve as reference lines to distinguish the horizontal/vertical positions of left and right synthesized/rotated view images.

FIGS. 11A and 11B illustrate the various stages for performing a rotation operation at an angle other than 90 degrees, 180 degrees, or 270 degrees utilizing the view image processor 116 (FIG. 2). The depth map generator 117 (FIG. 2) derives a depth map based on the left view image. The view image processor 116 rotates the left view image by the angle to generate a rotated left view image. The view image processor 116 then generates a new right view image based on the depth map, the original right view image and the rotated left view image. For example, the new right view image may be derived based on the depth map, the original right view image and interpolation involving the rotated, original, left view image.

Figure 13:
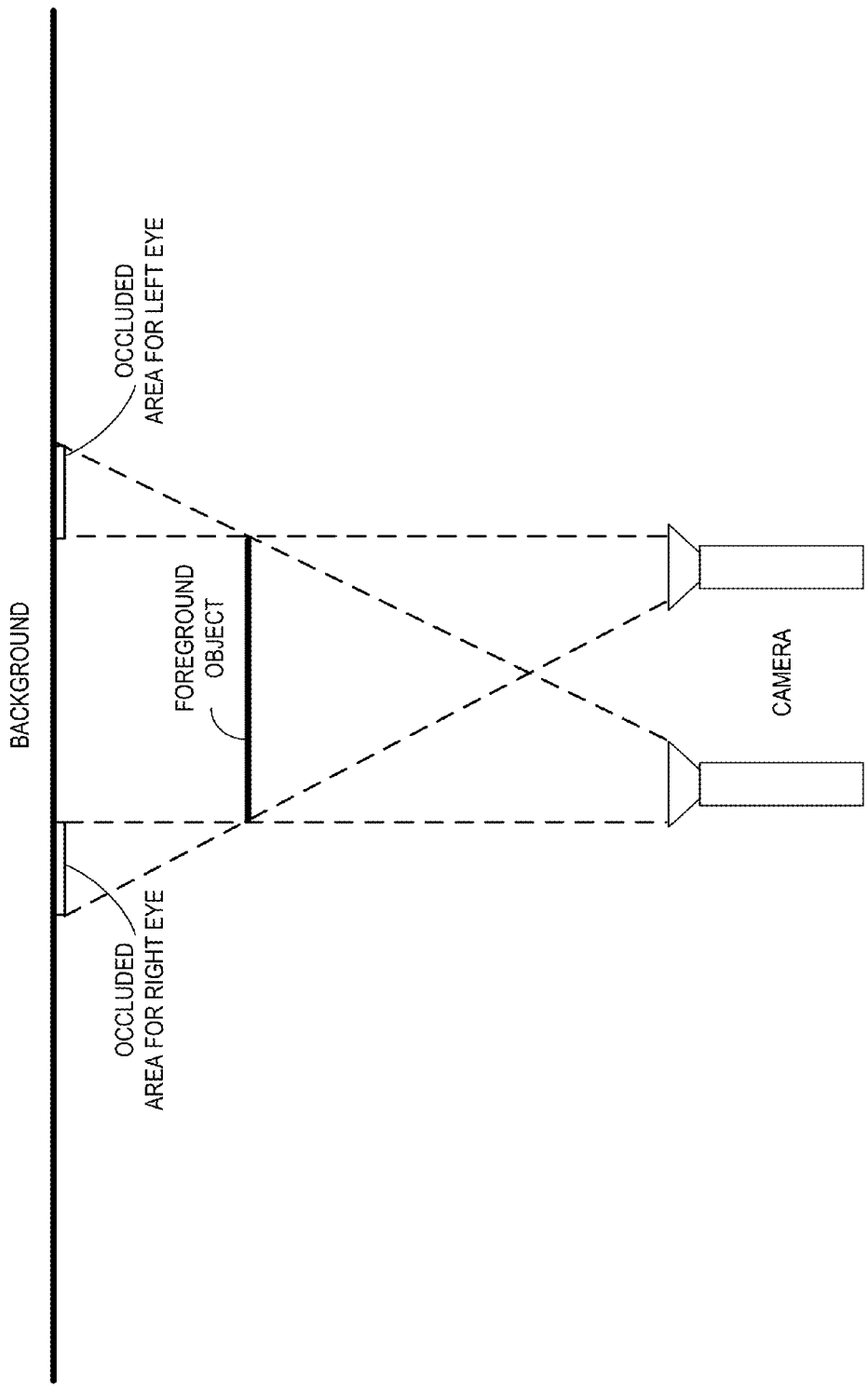
FIG. 13 provides views of a foreground object placed in front of a background.

With reference to FIGS. 11A and 11B, Stage 1 depicts an original left view image and original right view image, where the dashed outline in the right view image represents the occluded region as described in connection with FIG. 13. In Stage 2, the left view image is rotated as a rotated left view image. In Stage 3, a synthesized view image is generated by performing horizontal shift to the white solid triangle in the rotated left view image according to the depth map. Note that the shaded triangle represents the triangle shown previously in Stage 2. As a result, the values of a portion of pixels of the new right view image are determined based on values of a portion of pixels in the rotated left view image, wherein horizontal positions of the pixels of the rotated left view image are shifted according to the depth map.

In Stage 4, the values of a different portion of pixels of the new right view image are determined by combining values of neighboring pixels of the different portion of pixels with values of corresponding pixels in the original right view image. The different portion of pixels corresponds to the occluded region in the rotated left view image. The intersection of the shaded area shown in Stage 4 and the dotted area refers to the corresponding pixels in the right view image. For some embodiments, an inpainting or morphing technique may be applied for synthesizing the relative compliment of the dotted area in the shaded area.

In Stage 5, the synthesized new right view image is output by the view image processor 116. Note that for the non-limiting example shown in FIGS. 11A and 11B, the depiction of a triangle object is only for purposes of illustration. In general, different objects in the same image might be processed according to different depth values.

The original, right view image is used to account for the occluded regions described above in connection with FIG. 13. The view image processor 116 then replaces the original right view image with the new right view image. When the view image processor 116 completes processing of the view images, the image generator 119 (FIG. 2) merges the processed view images to generate a modified digital image.

Figure 12:
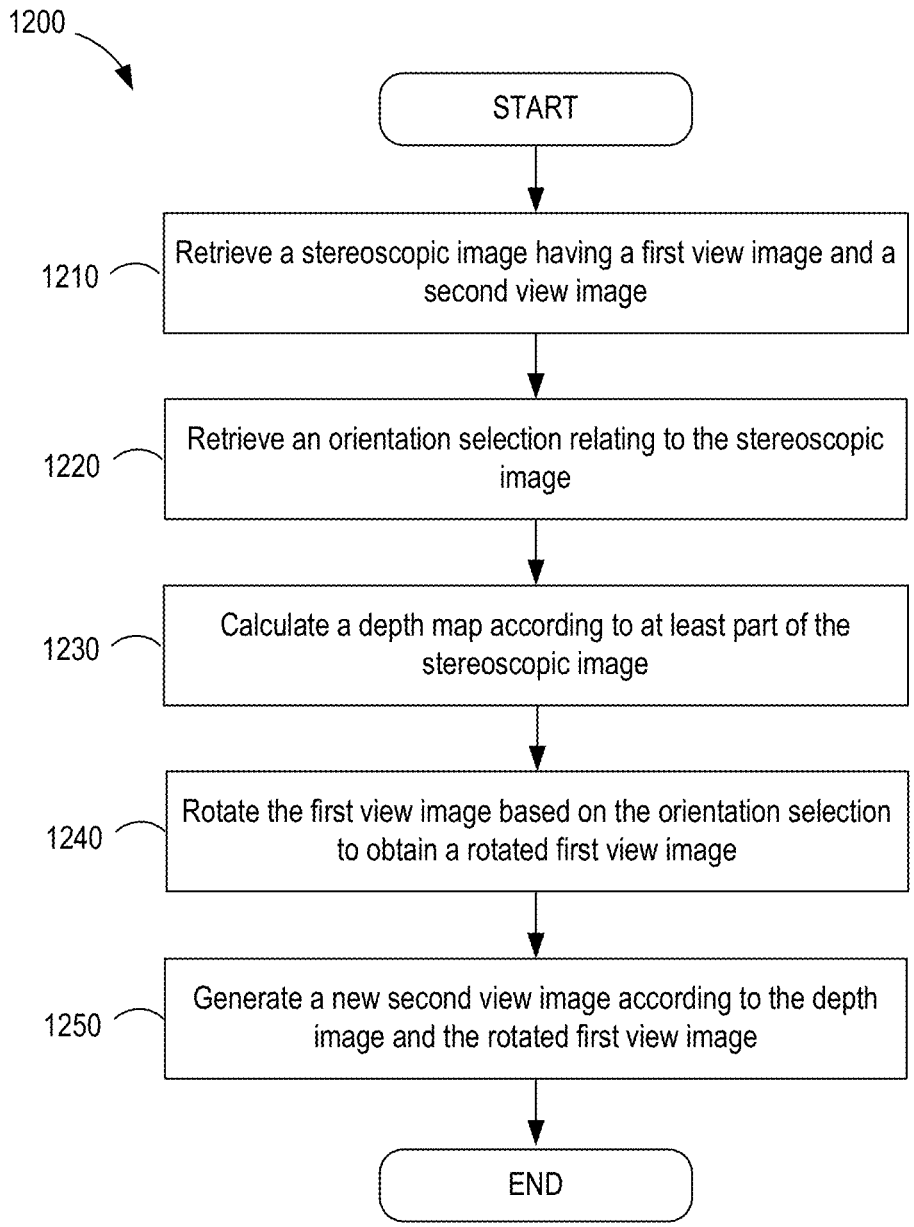
FIG. 12 is flowchart for modifying stereoscopic images implemented in the image processing system of FIG. 2.

FIG. 12 is a flowchart 1200 for modifying stereoscopic images implemented in the image processing system 102 (FIG. 2) using the various components described above. In block 1210, the image capture interface 112 (FIG. 2) in the image processing device 102 retrieves a stereoscopic image. In block 1220, the user interface logic 114 (FIG. 2) retrieves an orientation selection relating to the stereoscopic image, where the orientation selection comprises a selection other than one of: a horizontal flip selection and a 180 degree rotation selection. In block 1230, the depth map generator 117 calculates a depth map according to at least part of the stereoscopic image. In block 1240, the view image processor 116 rotates the first view image based on the orientation selection to obtain a rotated first view image. In block 1250, the view image processor 116 generates a new second view image according to the depth map and the first view image.

Note that the flowcharts of FIGS. 4-6 and 12 show examples of functionality of an implementation of portions of the image processing system 102. If embodied in software, each block may represent a module, segment, or portion of code that comprises program instructions to implement the specified logical function(s). The program instructions may be embodied in the form of source code that comprises human-readable statements written in a programming language or machine code that comprises numerical instructions recognizable by a suitable execution system such as a processor in a computer system or other system. The machine code may be converted from the source code, etc. If embodied in hardware, each block may represent a circuit or a number of interconnected circuits to implement the specified logical function(s).

Although the flowcharts of FIGS. 4-6 and 12 show a specific order of execution, it is understood that the order of execution may differ from that which is depicted. For example, the order of execution of two or more blocks may be scrambled relative to the order shown. Also, two or more blocks shown in succession in FIGS. 4-6 and 12 may be executed concurrently or with partial concurrence. Further, in some embodiments, one or more of the blocks shown in FIGS. 4-6 and 12 may be skipped or omitted. In addition, any number of counters, state variables, warning semaphores, or messages might be added to the logical flow described herein, for purposes of enhanced utility, accounting, performance measurement, or providing troubleshooting aids, etc. It is understood that all such variations are within the scope of the present disclosure.

Also, any logic or application described herein that comprises software or code can be embodied in any non-transitory computer-readable medium for use by or in connection with an instruction execution system such as, for example, a processor in a computer system or other system. In this sense, each may comprise, for example, statements including instructions and declarations that can be fetched from the computer-readable medium and executed by the instruction execution system. In the context of the present disclosure, a "computer-readable medium" can be any medium that can contain, store, or maintain the logic or application described herein for use by or in connection with the instruction execution system.

The computer-readable medium can comprise any one of many physical media such as, for example, magnetic, optical, or semiconductor media. More specific examples of a suitable computer-readable medium would include, but are not limited to, magnetic tapes, magnetic floppy diskettes, magnetic hard drives, memory cards, solid-state drives, USB flash drives, or optical discs. Also, the computer-readable medium may be a random access memory (RAM) including, for example, static random access memory (SRAM) and dynamic random access memory (DRAM), or magnetic random access memory (MRAM). In addition, the computer-readable medium may be a read-only memory (ROM), a programmable read-only memory (PROM), an erasable programmable read-only memory (EPROM), an electrically erasable programmable read-only memory (EEPROM), or other type of memory device.

It should be emphasized that the above-described embodiments are merely examples of possible implementations. Many variations and modifications may be made to the above-described embodiments without departing from the principles of the present disclosure. All such modifications and variations are intended to be included herein within the scope of this disclosure and protected by the following claims.

The invention claimed is:

1. A method implemented in an image processing device for modifying stereoscopic images, comprising:
   retrieving, by an image processing device, a stereoscopic image having at least a first view image and a second view image;
   retrieving an orientation selection relating to the stereoscopic image, the orientation selection comprising a selection other than one of: a horizontal flip selection and a 180 degree rotation selection, wherein the orientation selection comprises a selection of one of:
   a vertical flip of the stereoscopic image;
   a 90 degree rotation of the stereoscopic image;
   a 270 degree rotation of the stereoscopic image; and
   a rotation of the stereoscopic image at an angle not equal to one of: 90 degrees, 180 degrees, and 270 degrees;
   calculating a depth map according to at least part of the stereoscopic image;
   rotating the first view image based on the orientation selection to obtain a rotated first view image;
   generating a new second view image according to the depth map and the rotated first view image; and
   processing the first view image and the second view image according to the orientation selection, wherein processing the first view image and the second view image according to the orientation selection comprises:
   responsive to the orientation selection being a vertical flip of the stereoscopic image, flipping, in a vertical direction, both the first view image and the second view image.

2. The method of claim 1, wherein the first and second view images comprise a left view image and a right view image.

3. The method of claim 1, wherein processing the first view image and the second view image according to the orientation selection comprises:
   responsive to the orientation selection being one of: a 90 degree and a 270 degree rotation of the stereoscopic image, performing the steps of:
   deriving the depth map at least based on the first view image;
   rotating, by a specified angle, the first view image to obtain the rotated first view image; and
   generating the new second view image according to both the depth map and the rotated first view image.

4. The method of claim 3, wherein deriving a depth map at least based on the first view image comprises identifying feature points within the first view image.

5. The method of claim 4, wherein deriving a depth map at least based on the first view image further comprises determining a difference in horizontal positions of each feature point with respect to the first view image and the second view image.

6. A method implemented in an image processing device for modifying stereoscopic images, comprising:
   retrieving, by an image processing device, a stereoscopic image having at least a first view image and a second view image;
   retrieving an orientation selection relating to the stereoscopic image, the orientation selection comprising a selection other than one of: a horizontal flip selection and a 180 degree rotation selection, wherein the orientation selection comprises a selection of one of:
   a vertical flip of the stereoscopic image;
   a 90 degree rotation of the stereoscopic image;
   a 270 degree rotation of the stereoscopic image; and a rotation of the stereoscopic image at an angle not equal to one of: 90 degrees, 180 degrees, and 270 degrees;

calculating a depth map according to at least part of the stereoscopic image;

rotating the first view image based on the orientation selection to obtain a rotated first view image;

generating a new second view image according to the depth map and the rotated first view image; and processing the first view image and the second view image according to the orientation selection, wherein processing the first view image and the second view image according to the orientation selection comprises:

responsive to the orientation selection being a rotation of the stereoscopic image at an angle not equal to one of: 90 degrees, 180 degrees, and 270 degrees, performing the steps of:

deriving the depth map at least based on the first view image;

rotating, by the angle, the first view image to obtain the rotated first view image; and generating the new second view image according to each of: the depth map, the second view image, and the rotated first view image.

7. The method of claim 6, wherein generating the new second view image comprises:

determining values of a portion of pixels of the new second view image based on values of a portion of pixels in the rotated first view image, wherein horizontal positions of the pixels of the rotated first view image are shifted according to the depth map; and determining values of a different portion of pixels of the new second view image, wherein the different portion of pixels are occluded in the rotated first view image.

8. The method of claim 7, wherein the values of pixels correspond to color values of the pixels.

9. The method of claim 7, wherein determining the values of the different portion of pixels of the new second view image comprises combining values of neighboring pixels of the different portion of pixels with values of corresponding pixels in the second view image.

10. The method of claim 6, wherein deriving a depth map at least based on the first view image comprises:

identifying feature points within the first view image; and determining a difference in horizontal positions of each feature point with respect to the first view image and the second view image.

11. A system for modifying stereoscopic images, comprising:

an image processing device; and an application executable in the image processing device, the application comprising:

logic that retrieves a stereoscopic image having at least a first view image and a second view image;

logic that retrieves an orientation selection relating to the stereoscopic image, the orientation selection not being one of: a horizontal flip selection and a 180 degree rotation selection;

logic that calculates a depth map according to at least one of the view images;

logic that rotates the first view image based on the orientation selection to obtain a rotated first view image; and logic that generates a new second view image according to the depth map and the rotated first view image, wherein an input specifies a reorientation of the stereoscopic image, wherein the reorientation comprises one of:

a vertical flip of the stereoscopic image;

a 90 degree rotation of the stereoscopic image;

a 270 degree rotation of the stereoscopic image; and a rotation of the stereoscopic image at an angle not equal to one of: 90 degrees, 180 degrees, and 270 degrees, wherein responsive to the input being a rotation of the stereoscopic image at an angle not equal to one of: 90 degrees, 180 degrees, and 270 degrees, the logic that generates modified view images is configured to:

derive the depth map at least based on the first view image;

rotate, by the angle, the first view image to obtain the rotated first view image; and generate the new second view image, wherein the new second view image is generated by:

determining values of a portion of pixels of the new second view image based on values of a portion of pixels in the rotated first view image, wherein horizontal positions of the pixels of the rotated first view image are shifted according to the depth map; and determining values of a different portion of pixels of the new second view image, wherein the different portion of pixels are occluded in the rotated first view image, wherein determining the values of the different portion of pixels of the new second view image comprises combining values of neighboring pixels of the different portion of pixels in the rotated first view image with values of corresponding pixels in the second view image.

* * * * *